United States Patent [19]

Jalbert et al.

[11] Patent Number: 5,652,078
[45] Date of Patent: Jul. 29, 1997

[54] RELEASE LAYER FOR PHOTOCONDUCTORS

[75] Inventors: Claire A. Jalbert, Cottage Grove; Gaye K. Lehman, St. Paul, both of Minn.; James F. Sanders, Houlton, Wis.; David J. Schreifels, Vadnais Heights; Edward J. Woo, Woodbury, both of Minn.

[73] Assignee: Minnesota Mining and Manufacturing Company, St. Paul, Minn.

[21] Appl. No.: 706,092

[22] Filed: Aug. 30, 1996

Related U.S. Application Data

[63] Continuation of Ser. No. 431,022, Apr. 28, 1995, abandoned.
[51] Int. Cl.⁶ ........................................................ G03G 5/147
[52] U.S. Cl. .............................. 430/67; 430/66; 430/132
[58] Field of Search ........................ 430/67, 66, 96, 430/132

[56] References Cited

U.S. PATENT DOCUMENTS

| | | |
|---|---|---|
| 3,652,319 | 3/1972 | Amidon et al. . |
| 4,078,928 | 3/1978 | Keller . |
| 4,123,684 | 10/1978 | Sandford, Jr. . |
| 4,371,600 | 2/1983 | Schank et al. . |
| 4,448,815 | 5/1984 | Grenoble et al. . |
| 4,526,953 | 7/1985 | Dallavia, Jr. . |
| 4,595,602 | 6/1986 | Schank . |
| 4,600,673 | 7/1986 | Hendrickson et al. . |
| 4,606,934 | 8/1986 | Lee et al. . |
| 4,716,091 | 12/1987 | Yoshihara et al. . |
| 4,853,737 | 8/1989 | Hartley et al. . |
| 4,923,775 | 5/1990 | Schank . |
| 5,001,012 | 3/1991 | Sarkar et al. . |
| 5,213,589 | 5/1993 | Ronning et al. . |
| 5,262,259 | 11/1993 | Chou et al. . |
| 5,281,656 | 1/1994 | Thayer et al. . |
| 5,286,815 | 2/1994 | Leir et al. . |
| 5,291,251 | 3/1994 | Storlie et al. . |
| 5,340,679 | 8/1994 | Badesha et al. . |

FOREIGN PATENT DOCUMENTS

| | | |
|---|---|---|
| 0 300 426 | 1/1989 | European Pat. Off. . |
| 0 454 484 A2 | 4/1991 | European Pat. Off. . |
| 0 644 246 A2 | 9/1994 | European Pat. Off. . |
| 44-028037 | 12/1965 | Japan . |
| WO85/00901 | 2/1985 | WIPO . |

OTHER PUBLICATIONS

Polysiloxane Copolymers/Anionic Polymerization by van Beylen et al.

*Primary Examiner*—Christopher D. Rodee
*Attorney, Agent, or Firm*—Gary L. Griswold; Walter N. Kirn; Susan Moeller Zerull

[57] ABSTRACT

This invention is a photoconductive assembly comprising an electroconductive substrate, a photoconductive layer on a surface of the electroconductive substrate, and a release layer over the photoconductive layer wherein the release layer comprises a silicone polymer which has a bimodal distribution of chain lengths between cross-links.

27 Claims, No Drawings

RELEASE LAYER FOR PHOTOCONDUCTORS

This is a continuation of application Ser. No. 08/431,022 filed Apr. 28, 1995, Abandoned.

FIELD OF THE INVENTION

The present invention relates to a photoconductor element which is capable of transferring toner images to a receptor. More specifically, this invention relates to a release coating for the photoconductor element.

BACKGROUND OF THE INVENTION

Electrophotography forms the technical basis for various well known imaging processes, including photocopying and some forms of laser printing. The basic electrophotographic process involves placing a uniform electrostatic charge on a photoconductor element, imagewise exposing the photoconductor element to activating electromagnetic radiation, also referred to herein as "light", thereby dissipating the charge in the exposed areas, developing the resulting electrostatic latent image with a toner, and transferring the toner image from the photoconductor element to a final substrate, such as paper, either by direct transfer or via an intermediate transfer material.

The structure of a photoconductor element may be a continuous belt, which is supported and circulated by rollers, or a rotatable drum. All photoconductor elements have a photoconductive layer which conducts electric current when it is exposed to activating electromagnetic radiation. The photoconductive layer is generally affixed to an electroconductive support. The surface of the photoconductor is either negatively or positively charged such that when activating electromagnetic radiation strikes the photoconductive layer, charge is conducted through the photoconductor in that region to neutralize or reduce the surface potential in the illuminated region. An optional barrier layer may be used over the photoconductive layer to protect the photoconductive layer and extend the service life of the photoconductive layer. Other layers, such as adhesive or priming layers or charge injection blocking layers, are also used in some photoconductor elements.

Typically, a positively charged toner is attracted to those areas of the photoconductor element which retain a negative charge after the imagewise exposure, thereby forming a toner image which corresponds to the electrostatic latent image. The toner need not be positively charged. Some toners are attracted to the areas of the photoconductor element where the charge has been dissipated. The toner may be either a powdered material comprising a blend of polymer and colored particulates, typically carbon, or a liquid material of finely divided solids dispersed in an insulating liquid. Liquid toners are often preferable because they are capable of giving higher resolution images.

The toner image may be transferred to the substrate or an intermediate carrier by means of heat, pressure, a combination of heat and pressure, or electrostatic assist. A common problem that arises at this stage of electrophotographic imaging is poor transfer from the photoconductor to the receptor. Poor transfer may be manifested by low transfer efficiency and low image resolution. Low transfer efficiency results in images that are light and/or speckled. Low image resolution results in images that are fuzzy. These transfer problems may be alleviated by the use of a release coating.

The release layer is applied over the photoconductive layer or over the barrier layer if a barrier layer is being used. The release layer preferably adheres well to the photoconductive or barrier layer without the need for adhesives. Moreover, the release layer must not significantly interfere with the charge dissipation characteristics of the photoconductor construction.

Typical release coatings known in the electrophotographic arts include silicone polymers such as those disclosed in U.S. Pat. No. 4,600,673. Conventional siloxane release materials tend to swell signficantly in the hydrocarbon solvents which are used as carrier liquids in electrophotography. Swollen polymers generally have reduced toughness, and siloxanes, which typically do not have good tensile properties, are very easily scratched when swollen.

There is increasing demand for more imaging cycles per photoconductor construction. Thus, a more durable release layer is desired. Specifically, the release layer should be mechanically durable to withstand abrasion of the various rollers and scrapers which contact the photoconductor element. The release layer must also be resistant to toner carrier liquids.

SUMMARY OF THE INVENTION

The present invention provides a photoconductor construction comprising a photoconductor layer, and an electroconductive substrate, and a release layer which displays good release properties, as well as good durability and resistance to toner carrier liquids.

Solvent resistance may be improved by adding fillers to or by cross-linking the polymer. However, highly cross-linked or filled systems tend to have increased surface energy which causes a decreased release performance. Applicants have found a release layer which has increased solvent resistance with minimal sacrifice of release properties. The release layer of this invention comprises a cross-linked siloxane polymer with a bimodal distribution of chain lengths between crosslinks.

"Chain length between crosslinks" indicates how many monomeric units are in the backbone of the polymer between monomeric units from which branching or cross-linking has occurred. The bimodal distribution of such chain lengths indicates that there are a high number of relatively short chains between crosslinks and a high number of relatively long chains between crosslinks, but only a small number of chains having an intermediate length between crosslinks. Preferably, the relatively long chains have at least fifty, more preferably 100 to 1000, and most preferably 150 to 1000, monomeric units in the backbone of the polymer chain between crosslinks. Preferably, the relatively short chains have at most 30, more preferably 2 to 25, and most preferably 3 to 10 monomeric units in the backbone of the polymer chain between crosslinks. Preferably, the amount of long chains between cross-links is in the range of 0.5 to 50 wt. % based on total weight of the polymer, more preferably 5–30%, and most preferably 10–20%. The rest of the polymer has short chains between crosslinks although a very small number of the polymer chains, preferably less than 0.5%, may be of an intermediate length.

This siloxane polymer with a bimodal distribution of chain lengths between crosslinks is, preferably, the reaction product of a polymer with high functionality, a polymer with low functionality, and, optionally, a cross-linking agent. However, this polymer could alternatively be the cross-linked product of a single polymer provided the functional groups were spaced appropriately to provide a bimodal distribution of chain lengths between crosslinks. Such a polymer can be synthesized using anionic polymerization methods as are known to those skilled in the art.

"Functionality" and "functional groups" as used in this application is an indication of reactive groups. A polymer with high functionality has more reactive groups than a polymer with low functionality. Some reactive groups would include those groups which undergo free radical reactions, condensation reactions, hydrosilation addition reactions, hydrosilane/silanol reactions, or photoinitiated reactions.

The low molecular weight polymer with high functionality provides high cross-link density in the release layer which reduces the permeation of toner carrier liquids into the release layer and improves abrasion resistance. By including the high molecular weight polymer with low functionality, the inventors have found that good release properties can be maintained.

The crosslinking of the siloxanes can be undertaken by any of a variety of methods including free radical reactions, condensation reactions, hydrosilylation addition reactions, hydrosilane/silanol reactions, and photoinitiated reactions relying on the activation of an intermediate to induce subsequent cross-linking. Thus, the siloxane polymers of this invention may comprise a silicone polymer which is the reaction product of the components comprising:

A) 35 to 80 parts by weight of a siloxane polymer with a high content of functional groups capable of crosslinking having the formula:

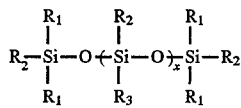

where
each $R_1$ and $R_3$ independently is an alkyl group, aryl group, or alkenyl group,
$R_2$ is, independently for each group —$SiR_2R_3O$— and each group —$SiR_1R_1R_2$, either an alkyl group, an aryl group, or a functional group capable of cross-linking and at least 3% of $R_2$ are functional groups capable of crosslinking, and
x is an integer greater than 0;

B) greater than 0 and less than or equal to 50 parts by weight of a siloxane polymer with a low content of functional groups capable of crosslinking having the formula

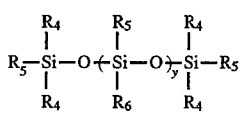

where
each $R_4$ and $R_6$ independently is an alkyl group, aryl group, or alkenyl group,
$R_5$ is, independently for each group —$SiR_5R_6O$— and each group —$Si(R_4)_2R_5$, either an alkyl group, an aryl group or a functional group capable of cross-linking and no more than 2.5% of $R_5$ are functional groups capable of cross-linking, and
y is an integer of at least 50; and, optionally, C) 5 to 30 parts by weight of a cross-linking agent having the formula

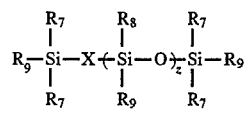

wherein
each $R_7$ and $R_8$ independently is hydrogen, an alkyl group, or an aryl group,
$R_9$ is, independently for each group —$SiR_8R_9O$— and each group —$Si(R_7)_2R_9$, either an alkyl group, an aryl group or a functional group capable of cross-linking and from 25 to 100% of $R_9$ are functional groups capable of cross-linking,
z is an integer from 0 to 1000,
X is a single bond, O, or a divalent organic linking group, and
there are at least two functional groups capable of cross-linking per molecule.

"Functional groups capable ofcross linking" means groups which may undergo free radical reactions, condensation reactions, hydrosilylation addition reactions, hydrosilane/silanol reactions, or photoinitiated reactions relying on the activation of an intermediate to induce subsequent cross-linking.

In addition to being used as a release layer for a photoconductor construction, the release polymer of this invention may advantageously be used as a coating on any substrate where there is a desire for good release properties, abrasion resistance, and resistance to liquid toners and similar solvents, materials or solutions.

According to one preferred embodiment the release layer comprises a silicone polymer which is the reaction product of the components comprising:

A) 35 to 80 parts by weight of a siloxane polymer with a high content of ethylenically unsaturated pendant groups having the formula:

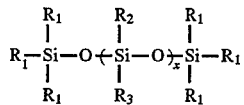

where
each $R_{1\ and\ R3}$ independently is an alkyl group, aryl group, or alkenyl group,
$R_2$ is, independently for each group —$SiR_2R_3O$—, either an alkyl group or an ethylenically unsaturated organic group and at least 3.5% of $R_2$ are an ethylenically unsaturated organic group, and
x is an integer of at least 100;

B) greater than 0 but less than or equal to 50 parts by weight of a siloxane polymer with a low content of ethylenically unsaturated pendant groups having the formula

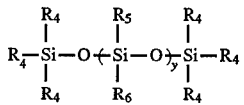

where
each $R_4$ and $R_6$ independently is an alkyl group, aryl group, or alkenyl group,
$R_5$ is, independently for each group —$SiR_5R_6O$—, either an alkyl group or an ethylenically unsaturated organic group and no more than 2.5% of $R_5$ are an ethylenically unsaturated organic group, and y is an integer of at least 100; and C) 5 to 30 parts by weight of a cross-linking agent having the formula

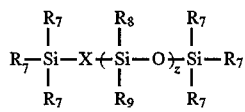

wherein each $R_7$ and $R_8$ independently is hydrogen, an alkyl group, or an aryl group, $R_9$ is, independently for each group —$SiR_8R_9O$—, either an alkyl group or hydrogen and from 25 to 100% of $R_9$ are hydrogen, z is an integer from 0 to 1000, X is a single bond, O, or a divalent organic linking group, and there are at least two hydrogen atoms per molecule.

As is well understood in this area, substitution is not only tolerated, but is often advisable and substitution is anticipated on the compounds used in the present invention. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical compound or substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, carboxyl, etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like. Substituents which react with active ingredients, such as very strongly electrophilic or oxidizing substituents, would of course be excluded by the ordinary skilled artisan as not being inert or harmless.

DETAILED DESCRIPTION OF THE INVENTION

The photoconductor construction of this invention comprises an electroconductive substrate which supports at least a photoconductor layer and a release layer. The photoconductors of this invention may be of a drum type construction, a belt construction, or any other construction known in the art.

Electroconductive substrates for photoconductive systems are well known in the art and are generally of two general classes: (a) self-supporting layers or blocks of conducting metals, or other highly conducting materials; (b) insulating materials such as polymer sheets, glass, or paper, to which a thin conductive coating, e.g. vapor coated aluminum, has been applied.

The photoconductive layer can be any type known in the art, including (a) an inorganic photoconductor material in particulate form dispersed in a binder or, more preferably, (b) an organic photoconductor material. The thickness of the photoconductor is dependent on the material used, but is typically in the range of 5 to 150 µm.

Photoconductor elements having organic photoconductor material are discussed in Borsenberger and Weiss, *Photoreceptors: Organic Photoconductors*, Ch. 9 Handbook of Imaging Materials, ed. Arthur S. Diamond, Marcel Dekker, Inc. 1991. When an organic photoconductor material is used, the photoconductive layer can be a bilayer construction consisting of a charge generating layer and a charge transport layer. The charge generating layer is typically about 0.01 to 20 µm thick and includes a material which is capable of absorbing light to generate charge carriers, such as a dyestuff or pigment. The charge transport layer is typically 10–20 µm thick and includes a material capable of transferring the generated charge carriers, such as poly-N-vinylcarbazoles or derivatives of bis-(benzocarbazole)-phenylmethane in a suitable binder.

In standard use of bilayer organic photoconductor materials in photoconductor elements, the charge generation layer is located between the conductive substrate and the charge transport layer. Such a photoconductor element is usually formed by coating the conductive substrate with a thin coating of a charge generation layer, overcoated by a relatively thick coating of a charge transport layer. During operation, the surface of the photoconductor element is negatively charged. Upon imaging, in the light-struck areas, hole/electron pairs are formed at or near the charge generation layer/charge transport layer interface. Electrons migrate through the charge generation layer to the conductive substrate while holes migrate through the charge transport layer to neutralize the negative charge on the surface. In this way, charge is neutralized in the light-struck areas.

Alternatively, an inverted bilayer system may be used. Photoconductor elements having an inverted bilayer organic photoconductor material require positive charging which results in less deterioration of the photoreceptor surface. In a typical inverted bilayer system, the conductive substrate is coated with a relatively thick coating (about 5 to 20 µm) of a charge transport layer, overcoated with a relatively thin (0.05 to 1.0 µm) coating of a charge generation layer. During operation, the surface of the photoreceptor is positively charged. Upon imaging, in the light-struck areas, hole/electron pairs are formed at or near the charge generation layer/charge transport layer interface. Electrons migrate through the charge generation layer to neutralize the positive charge on the surface while holes migrate through the charge transport layer to the conductive substrate. In this way, charge is again neutralized in the light-struck areas.

As yet another alternative, an organic photoconductive layer can comprise a single-layer construction containing a mixture of charge generation and charge transport materials and having both charge generating and charge transport capabilities. Examples of single-layer organic photoconductive layers are described in U.S. Pat. Nos. 5,087,540 and 3,816,118.

Suitable charge generating materials for use in a single layer photoreceptor and/or the charge generating layer of a dual layer photoreceptor include azo pigments, perylene pigments;, phthalocyanine pigments, squaraine pigments, and two phase aggregate materials. The two phase aggregate materials contain a light sensitive filamentary crystalline phase dispersed in an amorphous matrix.

The charge transport material transports the charge (holes or electrons) from the site of generation through the bulk of the film. Charge transport materials are typically either molecularly doped polymers or active transport polymers. Suitable charge transport materials include enamines, hydrazones, oxadiazoles, oxazoles, pyrazolines, triaryl amines, and triaryl methanes. A suitable active transport polymers is polyvinyl carbazole. Especially preferred transport materials are polymers such as poly(N-vinyl carbazole) and acceptor doped poly(N-vinylcarbazole). Additional materials are disclosed in Borsenberger and Weiss, *Photoreceptors: Organic Photoconductors*, Ch. 9 Handbook of Imaging Materials, ed. Arthur S. Diamond, Marcel Dekker, Inc. 1991.

Suitable binder resins for the organic photoconductor materials include, but are not limited to, polyesters, polyvinyl acetate, polyvinyl chloride, polyvinylidene chloride, polycarbonates, polyvinyl butyral, polyvinyl acetoacetal, polyvinyl formal, polyacrylonitrile, polyacrylates such as polymethyl methacrylate, polyvinyl carbazoles, copolymers of monomers used in the above-mentioned polymers, vinyl chloride/vinyl acetate/vinyl alcohol terpolymers, vinyl chloride/vinyl acetate/maleic acid terpolymers, ethylene/ vinyl acetate copolymers, vinyl chloride/vinylidene chloride copolymers, cellulose polymers and mixtures thereof. Suitable solvents used in coating the organic photoconductor materials include, for example, nitrobenzene, chlorobenzene, dichlorobenzene, trichloroethylene, tetrahydrofuran, and the like.

Inorganic photoconductors such as, for example, zinc oxide, titanium dioxide, cadmium sulfide, and antimony sulfide, dispersed in an insulating binder are well known in the art and may be used in any of their conventional versions with the addition of sensitizing dyes where required. The preferred binders are resinous materials, including, but not limit to, styrenebutadiene copolymers, modified acrylic polymers, vinyl acetate polymers, styrene-alkyd resins, soya-alkyl resins, polyvinylchloride, polyvinylidene chloride, acrylonitrile, polycarbonate, polyacrylic and methacrylic esters, polystyrene, polyesters, and combinations thereof.

The preferred release layer of this invention comprises a silicone polymer comprising the reaction product of the components:

A) 35 to 80, preferably 45 to 75, and more preferably 60 to 75, parts by weight of a siloxane polymer with a high content of ethylenically unsaturated pendant groups having the formula

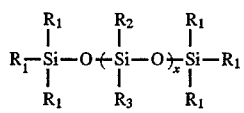

where
each $R_1$ and $R_3$ independently is an alkyl group of 1 to 20 carbon atoms, an aryl group of 6 to 20 carbon atoms, or an alkenyl group of 2 to 20 carbon atoms,
independently for each group $—SiR_2R_3O—$, $R_2$ is either an alkyl group ($R_2'$) having 1 to 10 carbon atoms or an ethylenically unsaturated organic group ($R_2''$) having 2 to 20 carbon atoms and at least 3.5%, preferably 4 to 40%, more preferably 10 to 30%, of $R_2$ are an ethylenically unsaturated organic group, and
x is an integer of at least 100, preferably 100 to 8000, and more preferably 200 to 6000;

B) greater than 0 but not more than 50, preferably 5 to 30, and more preferably 10 to 20 parts by weight of a siloxane polymer with a low content of ethylenically unsaturated pendant groups having the formula

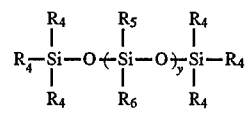

where
each $R_4$ and $R_6$ independently is an alkyl group of 1 to 20 carbon atoms, aryl group of 6 to 20 carbon atoms, or an alkenyl group of 2 to 20 carbon atoms,
independently for each group $—SiR_5R_6O—$, $R_5$ is either an alkyl group ($R_5'$) having 1 to 10 carbon atoms or an ethylenically unsaturated organic group ($R_5''$) having 2 to 20 carbon atoms and no more than 2.5%, preferably 0.1 to 1%, and more preferably 0.1 to 0.6%, of $R_5$ are an ethylenically unsaturated organic group,
y is an integer of at least 100, preferably 1,000 to 15,000, and more preferably 6,000 to 13,000, and
preferably there are at least two ethylenically unsaturated groups per molecule; and C) a cross-linking agent having the formula

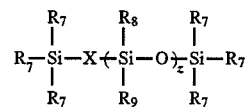

wherein
each $R_7$ and $R_8$ independently is hydrogen, an alkyl group of 1 to 20 carbon atoms, or an aryl group of 6 to 20 carbon atoms,
independently for each group $—SiR_8R_9O—$, $R_9$ is either an alkyl group ($R_9'$) having 1 to 10 carbon atoms or hydrogen and from 25 to 100%, preferably 50 to 100%, of $R_9$ are hydrogen,
z is an integer from 0 to 1000, preferably 5 to 100, and more preferably 10 to 50,
X is a divalent organic group, a single bond, or, more preferably, oxygen, and
there are at least two hydrogen atoms per molecule; and
the amount of component C is such that the number of hydrogen atoms pendant from silicon atoms from component C per ethylenically unsaturated group from components A and B is in the range of 0.6 to 7, preferably 1 to 5, more preferably 1.1 to 1.5.

Component A preferably has each $R_1$ being, independently, alkyl groups of 1–5 carbon atoms, more preferably methyl groups. In an alternative preferred embodiment, one of the $R_1$ for each end of the component A may be an alkenyl of 2 to 10 carbon atoms with the other $R_1$ being alkyl groups of 1–5 carbon atoms. The ethylenic unsaturation in an ethylenically unsaturated group $R_2'$ is preferably no more than 3 atoms from the silicon atom of the backbone. The alkyl group $R_2''$ is preferably a methyl group. $R_3$ preferably is a methyl group.

Component B preferably has each $R_4$ being, independently, alkyl groups of 1–5 carbon atoms, more preferably methyl groups. In an alternative preferred embodiment, one of the $R_4$ for each end of the component B may be an alkenyl of 2 to 10 carbon atoms with the other $R_4$ being alkyl groups of 1–5 carbon atoms. The ethylenic unsaturation in an ethylenically unsaturated group $R_5'$ is preferably no more than 3 atoms from the silicon atom of the backbone. The alkyl group $R_5''$ is preferably a methyl group. $R_6$ preferably is a methyl group.

Component C preferably has each $R_7$ being, independently, alkyl groups of 1–5 carbon atoms, more preferably methyl groups. In an alternative preferred embodiment, one of the $R_7$ for each end of the component C may be hydrogen with the other $R_7$ being alkyl groups of 1 to 5 carbon atoms. $R_8$ and $R_9'$ are preferably methyl groups.

Commercially available examples of component A include PS 422, PS 424, and PS 426 (all from Huls America Inc.) and KE-79 (from Shin Etsu Chemical Co. Ltd.). Commercially available examples of component B include PS 225 (Huls America Inc.), C158, C157, C162, C170, and C566 (all from Wacker Silicones Corp.) and KE-76 and KE-78 (from Shin Etsu Chemical Co. Ltd.). Commercially available examples of component C include NM203, PS 122.5 and PS 123 (from Huls America Inc.), DC7048 (Dow Corning Corp.), F-9W-9 (Shin Etsu Chemical Co. Ltd.) and VXL (O Si Specialties).

The above components are preferably reacted in the presence of a catalyst capable of catalyzing addition crosslinking of the above components. Suitable catalysts include the transition metal catalysts described for hydrosilylation in *The Chemistry of Organic Silicone Compounds*, Ojima, (S. Patai, J. Rappaport eds., John Wiley and Sones, New York 1989). Such catalysts may be either heat or radiation activated. Examples include, but are not limited to, alkene complexes of Pt(II), phosphine complexes of Pt(I) and Pt(O), and organic complexes of Rh(I). Choroplatinic acid based catalysts are the preferred catalysts. Inhibitors may be added as necessary or desired in order to extend the pot life and control the reaction rate. Commercially available hydrosilation catalysts based on chloroplatinic acid include: PC 075, PC 085 (Huls America Inc.), SyI-Off™ 8 7127, Syl-Off™ 7057 (Dow Corning Corp.), SL 6010-D1 (General Electric), VCAT-RT, VCAT-ET (O Si Specialties), and PL-4 and PL-8 (Shirt Etsu Chemical Co. Ltd.).

The above release layer is mechanically durable and very resistant to hydrocarbons which typically serve as toner carrier liquids. Preferably the thickness of the release layer is greater than 0.3 μm. The maximum thickness is dependent on the photoconductor material, but preferably the thickness is in the range of 0.4 to 3 μm, more preferably 0.5 to 1 μm.

Other cross-linking reactions may also be used to form the cross-linked siloxane polymer with a bimodai distribution of chain lengths between crosslinks. Crosslinking reactions that have been used include free radical reactions, condensation reactions, hydrosilylation addition reactions, and hydrosilane/silanol reactions. Crosslinking may also result from photoinitiated reactions relying on the activation of an intermediate to induce subsequent crosslinking. Peroxide induced free radical reactions that rely on the availability of C–H bonds present in the methyl side groups provide a non-specific crosslink structure which would not result in the desired network structure. However, the use of siloxanes containing vinyl groups with vinyl specific peroxides could provide the desired structure given the appropriate choice of starting materials. Free radical reactions can also be activated by UV light or other sources of high energy radiation, e.g., electron beams.

The condensation reaction can occur between complementary groups attached to the siloxane backbone. Isocyanate, epoxy, or carboxylic acids condensing with amine or hydroxy functionalities have been used to crosslink siloxanes. More commonly, the condensation reaction relies on the ability of some organic groups attached to silicon to react with water, thus providing silanol groups which further react with either the starting material or other silanol group to produce a crosslink. It is known that many groups attached to silicon are readily hydrolyzable to produce silanol groups. In particular, alkoxy, acyloxy, and oxime groups are known to undergo this reaction. In the absence of moisture, these groups do not react, and therefore, provide a sufficient working life relative to unprotected silanol groups. On exposure to moisture, these groups spontaneously hydrolyze and condense. These systems may be catalyzed as necessary. A subset of these systems are tri- or tetra-functional silanes containing three or four hydrolyzable groups.

Hydrosilane groups can react in a similar manner as described for the condensation reaction. They can react directly with SiOH groups or may first be converted to an OH group by reaction with water before condensing with a second SiOH moiety. The reaction may be catalyzed by either condensation or hydrosilylation catalysts.

The hydrosilylation addition reaction relies on the ability of the hydrosilane bond to add across a carbon carbon double bond in the presence of a noble metal catalyst. Such reactions are widely used in the synthesis of organofunctional siloxanes and to prepare release liners for pressure sensitive adhesives.

Well known photoinitiated reactions can be adapted to crosslink siloxanes. Organofunctional groups such as cinnamates, acrylates, epoxies, etc., can be attached to the siloxane backbone. Additionally, the photoinitiators may be grafted onto the siloxane backbone for improved solubility. Other examples of this chemistry include addition of a thiol across a carbon carbon double bond (typically, an aromatic ketone initiator is required), hydrosilane/ene addition (the free radical equivalent of the hydrosilylation reaction), acrylate polymerization (can also be electron beam activated), and radiation induced cationic polymerization of epoxides, vinyl ethers, and other functionalities.

The above cross-linking reactions are examples of reactions which could be used to provide a cross-linked siloxane polymer with a bimodal distribution of chain lengths between crosslinks. Other cross-linking reactions as known to those skilled in the art may also be used.

Optionally, the photoconductor element of this invention may further comprise a barrier layer between the photoconductor layer and the release layer. The barrier layer protects the photoconductor layer from the toner carrier liquid and other compounds which might damage the photoconductor. The barrier layer also protects the photoconductive layer from damage that could occur from charging the photoconductor element with a high voltage corona. The barrier layer, like the release layer, must not significantly interfere with the charge dissipation characteristics of the photoconductor element and must adhere well to the photoconductive layer and the release layer, preferably without the need for adhesives. The barrier layer may be any known barrier layer, such as a crosslinkable siloxanol-colloidal silica hybrid as disclosed in U.S. Pat. Nos. 4,439,509; 4,606,934; 4,595,602; and 4,923,775; a coating formed from a dispersion of hydroxylated silsesquioxane and colloidal silica in an alcohol medium as disclosed by U.S. Pat. No. 4,565,760; or a polymer resulting from a mixture of polyvinyl alcohol with methylvinylether/maleic anhydride copolymer. Preferably the barrier layer is a composite which includes silica and an organic polymer selected from the group consisting of polyacrylates, polyurethanes, polyvinyl acetals, sulfonated polyesters, and mixtures of polyvinyl alcohol with methylvinylether/maleic anhydride copolymer. The organic polymer and silica are preferably present in the barrier layer at a silica to polymer weight ratio ranging from 9:1 to about 1:1. Barrier layers of this type are disclosed in copending U.S. application Ser. No. 08/091,999 filed Jul. 15, 1993. Another preferred barrier layer, as disclosed in copending U.S. application Ser. No. 08/112,418, is a composite material of an organic polymer with a silanol. The silanol has the formula

wherein:

Y includes, for example, alkyl or alkoxy groups having from 1 to 6 carbon atoms; alkoxyalkyl groups in which the alkoxy portion contains from 1 to 2 carbon atoms and the alkyl portion contains from 1 to 6 carbon atoms; halogenated alkyl groups having from 1 to 6 carbon atoms and from 1 to 2 halogen substituents; aminoalkyl groups having from 1 to 6 carbon atoms and one amino group attached to either the 2, 3, 4, 5 or 6 carbon atom; a vinyl group; a phenyl group which may contain 1 to 2 halogen substituents; a cycloalkyl group having from 5 to 6 carbon atoms and which may contain 1 to 2 substituents; and hydrogen, a is a number ranging from 0–2, b is a number ranging from 2–4, and a plus b equals 4.

The organic polymer is preferably selected from the group consisting of polyacrylates, polyurethanes, polyvinyl acetals, sulfonated polyesters, and mixtures of polyvinyl alcohol with methylvinylether/maleic anhydride copolymer.

Other layers, such as primer layers, substrate blocking layers, etc. as are known in the art may also be included in the photoconductor construction.

EXAMPLES

The following non-limiting examples are provided to illustrate the invention. The ring coating process used in the following examples is described in Borsenberger, P. S. and D. S. Weiss, *Organic Photoreceptors for Imaging Systems*, Marcel Dekker, Inc., New York, 1993, p. 294.

The photoconductors of these Examples were tested according to the following procedures:

Norpar™ 12 Durability Wiper Test

The Norpar™ 12 durability wiper consisted of a 6.25" (15.9 cm) diameter aluminum drum and 5 stainless steel shoes with concave surfaces having radii to match the drum. The drum was positioned horizontally and attached to a gear and motor which enabled rotation of the drum at a speed of 40 rev/min. The 5 stainless steel shoes rested, by their own weight (about 300g), concave side down, on the top side curve of the drum. The shoes were held in place so that they did not move with the rotation of the drum, but could move vertically. Two layers of paper toweling were wrapped around the drum and then soaked with Norpar™ 12. One 1.25"×4" (3.175 cm×10.16 cm) strip of the photoconductor construction was secured onto the curved surface of each metal shoe so that, when the shoes were in place, the release surface was in contact with the paper toweling. The drum was then rotated at 40 rev/min for 800 revolutions. For samples with more than 800 wiping revolutions, the paper toweling was replaced by fresh Norpar™ 12 soaked toweling every 800 revolutions. After wiping, the sample strips were air dried at least overnight before peel tests or ink electroplating was done.

Scratch Ratings

After Norpar™ 12 wiping was completed, samples were rated for visually apparent scratches. A rating of 1.0 corresponded to no visual scratches, while a rating of 5.0 corresponded to many scratches, to the point of much of the release layer having been removed from the sample strip.

Peel Test to Measure Release Force

Slip/peel tester model SP-102B-3M90 from Instrumentors, Inc. was utilized for tape peel force measurements. The 1.25"×4" (3.175 cm×10.16 cm) sample strips were each affixed to the working platen with double stick tape. 3M 202 masking tape, 1" (2.54 cm) wide, was applied to the sample release surface or ink surface electroplated on a release surface (see below) and a 15 lb. (6.8 kg) roller was rolled over the tape 6 times. Immediately after adhering the tape, an MB-10 load cell was used to measure the average force (g/in) required to peel the tape or the tape/ink combination off the surface at 180° and 90"/min (228.6 cm/min) for 2 seconds.

Ink Transfer Ratings

Sample strips were electroplated with black Digital Matchprint™ Proofing Ink Replenisher diluted in Isopar™ G to 0.4% solids. The strips were each placed with the sample surface facing a plate of glass, which was coated with electrically conducting material and had surface area similar to that of the strips, at a distance of 4.2 mm and both were dipped into the 0.4% ink up to ~3.75" (9.52 cm). The ink was electroplated onto the sample surface at 600 V for ~5 sec, followed by air drying the electroplated samples for 30 min. Then 202 tape was applied and a peel test was done as described above to remove the ink with the tape while simultaneously measuring the peel force. The effectiveness of ink transfer was then rated according to how much ink remained on the sample strips (by visual inspection) after this procedure. A rating of 1.0 corresponded to complete ink transfer off the sample (no ink left on the sample), while a rating of 10.0 corresponded to very little to no ink transfer off the sample (ink completely covering the sample).

Example 1

Organic Photoconductive Layer Coating Solution:

| Millbase: | |
|---|---|
| X-form metal free Phthalocyanine pigment (available from Zeneca Corp.) | 100 g |
| EC-130 (vinyl chloride copolymer, available from Sekisui; 15% by weight in tetrahydrofuran) | 400 g |
| Mowital ™ B60HH (polyvinylbutyral resin, available from Hoechst Celanese; 15% by weight in tetrahydrofuran) | 600 g |
| Tetrahydrofuran | 1000 g |

The materials listed above were mixed together in a 1 gallon (3.78 l) glass bottle. The mixture was then milled in a 250 mL horizontal sandmill with 0.8 mm ceramic milling media for 20 hours at a rotor speed of 4,000 rpm.

A coating solution was then prepared by mixing the following materials:

| | |
|---|---|
| Millbase prepared above (12.4% by weight in THF) | 4230 g |
| Tinuvin-770 ™ (UV stabilizer, available from Ciba Geigy) | 36 g |
| Mowital ™ B60HH (15% polyvinylbutyral resin in THF, available from Hoechst Celanese) | 5154 g |
| Tetrahydrofuran (THF) | 1731 g |

The materials listed above were mixed thoroughly together and filtered through a 5 micron absolute filter (available from Porous Media Corp.). Just prior to coating, 14.5g of Mondur CB-601 (available from Mobay Corp.), 0.87g of Dibutyl tin dilaurate catalyst and 58g of THF were added to 1700g of the filtered solution described above. The final coating solution was extrusion coated onto 0.1 mm (4 mils) aluminum vapored coated polyester and air dried at 182° C. (360° F.) for 1 minute, resulting in a dry coating thickness of 7.5 microns.

Barrier Layer Coating Solution:

| | |
|---|---|
| 3-Glycidoxypropyltrimethoxysilane (5% solids in a 50/50 mixture of water and 2-propanol available from Huls America Inc.) | 10.0 g |
| Nalco ™ 1057 (30% colloidal silica in 2-propoxyethanol, available from Nalco Chemical) | 16.0 g |
| 2-propanol available from Union Carbide Chemicals & Plastics Co.) | 176.0 g |
| Polyvinylbutyral (5% solids in a mixture of 2-propanol and ethanol 70/30, available from Sukisui Chemical Co. Ltd.) | 48.0 g |

The above ingredients were combined in the order listed. The solution was agitated on a shaker table for 30 minutes, stirred and then allowed to stand for 24 hours. The coating solution was filtered through a 5 micron absolute filter. The polyester substrate coated with the photoconductor layer, described above, was attached to a drum cylinder and then ring coated with the barrier layer coating solution. The sheet was then removed from the drum and placed in a 150° C. for 5 minutes to give a dry coating thickness of 0.2 micron.

Release Layer Coating Solution Formulation I:

| | |
|---|---|
| Component A: Vinylmethyl dimethylsiloxane copolymer* 10.38 mole % vinylmethyl; 15% by weight in heptane) | 3.8 g |
| Component B: C-158 (vinylmethyl dimethyl-siloxane copolymer, having 0.2 mole % vinylmethyl, available from Wacker Silicones; 15% by weight in heptane) | 1.2 g |
| Component C: NM203 (polymethylhydrosiloxane, available from Huls America) | 0.2 g |
| Heptane | 20.0 g |
| Platinum catalyst (0.15 wt % Pt coordinated with 0.85% tetra vinyl disiloxane in heptane) | 0.1 g |

*The siloxane copolymer was prepared by using the method described in McGrath, J.E., and I. Yilgor, Adv. Polymer Science, vol. 86, p. 1, 1989.

The above ingredients were combined in the order listed. The coating solution was ring coated onto the barrier layer described above by attaching the sheet to a drum cylinder. The coating was then removed from the drum and cured in a 150° C. convection oven for 10 minutes to give a coating thickness of 0.7 micron.

The release layer of this invention was tested as indicated above and was observed to have good resistance to Norpar™ 12, good durability, and good release properties.

EXAMPLE 2

Photoconductor elements were prepared as above with the exception that the organic photoconductive layer was coated from a 90/10 blend of THF/cyclohexanone. As a control, a 3% by weight solids solution of a silicone as disclosed in U.S. Pat. No. 4,600,673 col. 10, lines 12–43, was ring coated at 0.76 in/sec (1.93 cm/sec) on the same type of photoconductor/barrier construction and was oven dried at 110° C. for 10 min. After 1600 wiping revolutions, the release coating of this invention maintained good release properties while the control release coating showed poor durability to Norpar™ 12 as evidenced by the high values for peel forces and transfer ratings shown in the Table below.

| Release Material | # wiping revolutions | peel force, g/cm | ink peel force, g/cm | ink transfer rating |
|---|---|---|---|---|
| Control | 0 | 0.8 | 53.7 | 2.8 |
| Formulation I | 0 | 3.9 | 5.35 | 1.4 |
| Control | 1600 | 513 | 581.5 | 8.8 |
| Formulation I | 1600 | 8.1 | 10.0 | 1.4 |

EXAMPLE 3

The amount of component B (C-158 from Wacker Silicones Corp.) was varied from that in formulation I as follows:

| | | |
|---|---|---|
| Formulation I | 1.2 g C-158 | 20.0 g heptane |
| Formulation II | 0.0 g C-158 | 16.4 g heptane |
| Formulation III | 2.1 g C-158 | 23.1 g heptane |

These solutions along with Formulation I were ring coated as in Example 1 and tested for Norpar™ 12 durability, peel force, and scratch resistance. The results shown in the Table below demonstrate that while inclusion of some of Component B improves release properties, too large an amount of component B leads to a deterioration in resistance to the solvent and deterioration in abrasion resistance.

| Release Material | # wiping revolutions | peel force, g/cm | scratch rating |
|---|---|---|---|
| Formulation II | 0 | 13.9 | — |
| Formulation I | 0 | 4.6 | — |
| Formulation III | 0 | 4.8 | — |
| Formulation II | 1600 | 14.5 | 2.1 |
| Formulation I | 1600 | 6.7 | 2.1 |
| Formulation III | 1600 | 21.1 | 3.2 |
| Formulation II | 3200 | 17.7 | 2.4 |
| Formulation I | 3200 | 22.5 | 3.2 |
| Formulation III | 3200 | 175 | 4.5 |

EXAMPLE 4

The amount and type of Component C as well as the amount of component A were varied as follows:

| | | |
|---|---|---|
| Formulation I | 3.8 g component A | 0.2 g NM203 |
| Formulation IV | 4.63 g component A | 0.07 g NM203 |
| Formulation V | 2.19 g component A | 0.44 g PS123.5 |

These solutions along with Formulation I were ring coated as in Example 1. Reducing the level of NM203 and increasing the amount of component A had no adverse effects to the release durability after 3200 wiping revolutions. Using PS 123.5 (15–18% methylhydro, 82–85% dimethyl siloxane copolymer from Huls) and decreasing the amount of component A as shown in Formulation V, however, significantly lowered the durability. This was shown by the very high peel force obtained after only 800 wiping revolutions. The crosslink density appeared to be important to performance in the wiping and peel force tests since the low functionality hydride containing material, PS 123.5, gave high peel forces. However, with a more tightly crosslinked system, using NM203, a wide range of hydride to vinyl ratios gave acceptable results.

| Release Material | # wiping revolutions | peel force, g/cm |
| --- | --- | --- |
| Formulation V | 0 | 4.3 |
| Formulation IV | 0 | 4.6 |
| Formulation I | 0 | 4.6 |
| Formulation V | 800 | 486 |
| Formulation IV | 800 | 4.2 |
| Formulation I | 800 | 5.5 |
| Formulation V | 1600 | — |
| Formulation IV | 1600 | 8.34 |
| Formulation I | 1600 | 6.7 |
| Formulation V | 3200 | — |
| Formulation IV | 3200 | 7.0 |
| Formulation I | 3200 | 22.5 |

EXAMPLE 5

The effect of adjusting vinyl content and viscosity of component A was measured by substituting component A (vinylmethyl, dimethylsiloxane copolymer,) from formulation I with the following:

|  |  | mole % vinylmethyl | viscosity centipoise |
| --- | --- | --- | --- |
| Formulation I: | A | 10 | 275,000 |
| Formulation VI: | A2 | 29 | 4,700,000 |
| Formulation VII: | A3 | 26 | 152,500 |
| Formulation VIII: | A4 | 24 | 580,000 |

The amounts of the components for each formulation were the same as in formulation I. These formulations were ring coated as in Example 1. In general, as shown below, all the formulations with resins A through A4 were durable to Norpar wiping as shown by the low peel forces and scratch ratings.

| Release Material | # wiping revolutions | g/cm | rating |
| --- | --- | --- | --- |
| Formulation I | 0 | 4.6 | — |
| Formulation VI | 0 | 7.1 | — |
| Formulation VII | 0 | 7.6 | — |
| Formulation VIII | 0 | 7.1 | — |
| Formulation I | 1600 | 6.7 | 2.1 |
| Formulation VI | 1600 | 8.8 | 1.1 |
| Formulation VII | 1600 | 11.3 | 2.0 |
| Formulation VIII | 1600 | 10.0 | 1.9 |
| Formulation I | 3200 | 22.5 | 3.2 |
| Formulation VI | 3200 | 12.4 | 1.6 |
| Formulation VII | 3200 | 18.2 | 2.4 |
| Formulation VIII | 3200 | 22.5 | 3.0 |

EXAMPLE 6

An inverted dual layer photoconductor was coated onto an aluminized polyester film as follows:

To 1000 gm of 12.5% polycarbonate Z (Mitsusbishi Gas Co.)/PE 2200 (Shell Chemical Co.) (99:1) in toluene was added 62.5 gm 9-ethylcarbazole-3-aldehyde-N-methyl-N-phenyl-hydrazone and 62.5 gm 9-ethylcarbazole-3-aldehyde-N,N-diphenyl-hydrazone. This mixture was dissolved and coated onto aluminized polyester film and dried to afford a 15 micron charge transport layer. On top the charge transport layer was coated a 2.8% solids dispersion of(1:1) x-form-metal-free phthalocyanine (Zeneca, Ltd)/S-lec Bx-5 (Sekisusi Chemical Co.) to afford a 0.1 micron dried charge generation layer.

Onto this photoconductor the following barrier layer formulation was coated:

Barrier Layer Coating Formulation:

| 3-Glycidoxypropyltrimethoxysilane (from Huls America Inc.) | 0.15 g |
| --- | --- |
| Nalcol ™ 2326 (14.5% colloidal silica in water, available from Nalco Chemical) | 3.1 g |
| Deionized water | 6.5 g |
| Triton ™ X-100 surfactant (from Union Carbide Chemicals & Plastics Co.) | 0.02 g |
| Polymer solution (2.4 parts Elvanol ™ 50–42 PVA from DuPont, 0.2 parts Gantrez ™ AN-169 methylvinylether/maleic anhydride copolymer from GAF Corp., and 98.4 parts water) | 22.3 g |

The release layer having Formulation I was coated over the barrier layer.

This photoconductor construction was tested for peel force initially and after 1600 and 3200 Norpar™ wipings. The respective peel forces were 5.0, 9.8, and 54.7 g/cm respectively.

EXAMPLE 7

The release coating of Formulation I was coated on aluminized polyester at 3.7% solids, 1.85% solids and 0.93% solids. Thickness measurements were taken using Edmunds Gage TOL 2010 single head. The release coatings had average dry thicknesses of 0.75 μm, 0.23 μm, and 0.13 μm, respectively. These same formulations at the respective % solids were coated on the photoconductor construction of Example 2. The dried samples were wiped with Norpar™ 12 as described above and peel tested. The results are shown in the Table below:

| Thickness (μm) | # wiping revolutions | peel force, g/cm |
| --- | --- | --- |
| 0.75 | 1600 | 4.8 |
| 0.23 | 1600 | 10.0 |
| 0.13 | 1600 | 390 |
| 0.75 | 3200 | 6.3 |
| 0.23 | 3200 | 8.9 |
| 0.13 | 3200 | 440 |

What is claimed is:

1. A photoconductor element comprising an electroconductive substrate, a photoconductive layer on one surface of the electroconductive substrate, and over the photoconductive layer, a release layer comprising a silicone polymer which has a bimodal distribution of chain lengths between cross-links and which is the reaction product of components comprising:

A) 35 to 80 parts by weight of a siloxane polymer with a high content of functional groups capable of crosslinking having the formula:

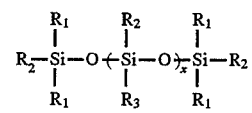

where each $R_1$ and $R_3$ independently is an alkyl group, aryl group, or alkenyl group, $R_2$ is, independently for each group —$SiR_2R_3O$— and each group —$SiR_1R_1R_2$, either an alkyl group, an aryl group, or a functional group capable of crosslinking and at least 3% of $R_2$ are functional groups capable of crosslinking, and x is an integer greater than 0;

B) greater than 0 and less than or equal to 50 parts by weight of a siloxane polymer with a low content of functional groups capable of crosslinking having the formula

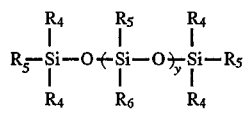

where
each $R_4$ and $R_6$ independently is an alkyl group, aryl group, or alkenyl group,
$R_5$ is, independently for each group —$SiR_5R_6O$— and each group —$Si(R_4)_2R_5$, either an alkyl group, an aryl group or a functional group capable of cross-linking and no more than 2.5% of $R_5$ are functional groups capable of cross-linking, and
y is an integer of at least 50; and, optionally, C) 5 to 30 parts by weight of a cross-linking agent having the formula

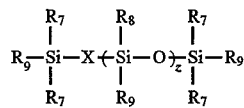

wherein
each $R_7$ and $R_8$ independently is hydrogen, an alkyl group, or an aryl group,
$R_9$ is, independently for each group —$SiR_8R_9O$— and each group $Si(R7)_2R_9$, either an alkyl group, an aryl group or a functional group capable of cross-linking and from 25 to 100% of $R_9$ are functional groups capable of cross-linking,
z is an integer from 0 to 1000,
X is a single bond, O,or a divalent organic linking group, and there are at least two functional groups capable of cross-linking per molecule.

2. The element of claim 1 in which the amount of the siloxane polymer A is 45 to 75 parts by weight, the amount of siloxane polymer B is 5 to 30 parts by weight, and the amount of crosslinking agent C is such that the number of hydrogen atoms pendant from Si atoms per functional group capable of crosslinking pendant from Si atoms is 0.6 to 7.0.

3. The element of claim 1 in which the amount of the siloxane polymer A is 60 to 75 parts by weight, the amount of siloxane polymer B is 10 to 20 parts by weight, and the amount of crosslinking agent C is such that the number of hydrogen atoms pendant from Si atoms per functional group capable of crosslinking pendant from Si atoms is 1 to 5.

4. The element of claim 1 in which x is an integer from 100 to 8000.

5. The element of claim 1 in which 10 to 30% of the $R_2$ groups are ethylenically unsaturated organic groups.

6. The element of claim 1 in which the at least 3% of $R_2$ which are functional groups capable of cross linking are ethylenically unsaturated groups which have a carbon to carbon double bond no more than 3 atoms away from the silicon atom of the siloxane polymer.

7. The element of claim 1 wherein for those $R_2$ which are selected from alkyl groups and aryl groups, $R_2$ is methyl.

8. The element of claim 1 in which $R_3$ is a methyl group.

9. The element of claim 1 in which y is an integer from 1000 to 15,000.

10. The element of claim 1 in which no more than 1% of $R_5$ are ethylenically unsaturated organic groups.

11. The element of claim 1 in which the no more than 2.5% of $R_5$ which are functional groups capable of cross linking are ethylenically unsaturated groups which have a carbon to carbon double bond no more than 3 atoms away from the silicon atom of the siloxane polymer.

12. The element of claim 1 wherein for those $R_5$ which are selected from alkyl groups and aryl groups, $R_5$ is methyl.

13. The element of claim 1 in which $R_6$ is a methyl group.

14. The element of claim 1 in which z is an integer from 5 to 50.

15. The element of claim 1 wherein for those $R_9$ which are selected from alkyl groups and aryl groups, $R_9$ is methyl.

16. The element of claim 1 in which $R_8$ are methyl groups.

17. The element of claim 1 in which 50 to 100% of $R_9$ are hydrogen.

18. The element of claim 1 in which said components further comprise a hydrosilation catalyst.

19. The element of claim 18 in which said catalyst is a chloroplatinic acid based catalyst.

20. The photoconductor element of claim 1 in which the photoconductive layer is an organic photoconductor material comprising a charge generating layer and a charge transport layer.

21. The photoconductor element of claim 20 in which the charge transport layer is located between the electroconductive substrate and the charge generation layer.

22. The photoconductor element of claim 1 wherein the thickness of the release layer is greater than 0.3 µm.

23. A photoconductor element comprising an electroconductive substrate, a photoconductive layer on one surface of the electroconductive substrate, and over the photoconductive layer, a release layer comprising a silicone polymer which has a bimodal distribution of chain lengths between cross-links and which is the reaction product of components comprising:

A) 35 to 80 parts by weight of a low molecular weight siloxane polymer with a high content of ethylenically unsaturated pendant groups having the formula:

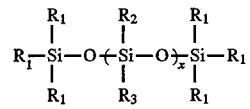

where
each $R_1$ and $R_3$ independently is an alkyl group, aryl group, or alkenyl group,
$R_2$ is, independently for each group —$SiR_2R_3O$—, either an alkyl group or an ethylenically unsaturated organic group and at least 3.5% of $R_2$ are an ethylenically unsaturated organic group, and
x is an integer of at least 100;

B) greater than 0 and not more than 50 parts by weight of a high molecular weight siloxane polymer with a low content of ethylenically unsaturated pendant groups having the formula

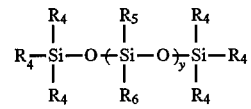

where
each $R_4$ and $R_6$ independently is an alkyl group, aryl group, or alkenyl group,
$R_5$ is, independently for each group —$SiR_5R_6O$—, either an alkyl group or an ethylenically unsaturated organic group and no more than 2.5% of $R_5$ are an ethylenically unsaturated organic group, and y is an integer of at least 100; and C) 5 to 30 parts by weight of a cross-linking agent having the formula

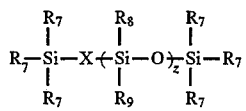

wherein each $R_7$ and $R_8$ independently is hydrogen, an alkyl group, or an aryl group, $R_9$ is independently for each group —$SiR_8R_9O$— either an alkyl group or hydrogen and from 25 to 100% of $R_9$ are hydrogen, z is an integer from 0 to 1000, X is a single bond, O, or a divalent organic linking group, and there are at least two hydrogen atoms per molecule.

24. The element of claim 23 in which each $R_1$ is independently an alkyl group of 1–5 carbon atoms or in which one of $R_1$ at each end of the siloxane polymer A is an alkenyl group of 2 to 10 carbon atoms and the remaining $R_1$ are independently alkyl groups of 1 to 5 carbon atoms.

25. The element of claim 23 in which $R_4$ are either independently alkyl groups of 1 to 5 carbon atoms or in which one of $R_4$ at each end of the siloxane polymer B is an alkenyl group of 2 to 10 carbon atoms and the remaining $R_4$ are independently alkyl groups of 1 to 5 carbon atoms.

26. The element of claim 23 in which $R_7$ are alkyl groups of 1 to 5 carbon atoms or in which one of $R_7$ at each end of the cross-linking agent C is hydrogen and the remaining $R_7$ are independently alkyl groups of 1 to 5 carbon atoms.

27. The element of claim 23 in which $R_1$, $R_3$, $R_4$, $R_6$, $R_7$, and $R_8$ are methyl groups, 10 to 30% of $R_2$ are ethylenically unsaturated organic compounds of 2 to 20 carbon atoms and the remaining $R_2$ are methyl groups, no more than 1% of $R_5$ are ethylenically unsaturated organic groups of 2 to 20 carbon atoms and the remaining $R_5$ are methyl groups, 50 to 100% of $R_9$ are hydrogen and the remaining $R_9$ are methyl groups, X is O, x is an integer from 200 to 6000, y is an integer from 6000 to 13,000, and z is an integer from 10 to 25.

* * * * *

UNITED STATES PATENT AND TRADEMARK OFFICE
CERTIFICATE OF CORRECTION

PATENT NO.: 5,652,078
DATED: July 29, 1997
INVENTOR(S): Jalbert et al.

It is certified that error appears in the above-identified patent and that said Letters Patent is hereby corrected as shown below:

Col. 4, line 20, "ofcross linking" should be --of crosslinking--.

Col. 4, line 46, "$R_1$ and $R_3$" should be --$R_1$ and $R_3$--.

Col. 9, line 36, "Shirt" should be --Shin--.

Col. 9, line 44, "bimodai" should be --bimodal--.

Col. 12, lines 19-20, "Isopar™ G *to* 0.4%" should be --Isopar™ G to 0.4%--.

Col. 15, line 5 (second line of table), "4.6" should be --3.0--.

Col. 17, line 30, "Si(R7)$_2$R$_9$" should be --Si($R_7$)$_2$$R_9$--.

Signed and Sealed this

Sixteenth Day of June, 1998

BRUCE LEHMAN

*Attest:*

*Attesting Officer*          Commissioner of Patents and Trademarks